(12) United States Patent
Stettes et al.

(10) Patent No.: US 7,036,688 B2
(45) Date of Patent: May 2, 2006

(54) SYSTEM FOR WHIPPING A FLUID SLURRY AND METHOD THEREFORE

(75) Inventors: Gregory G. Stettes, Pacific, MO (US); Franklin D. Newkirk, Winfield, MO (US)

(73) Assignee: Crane Co., Stamford, CT (US)

( * ) Notice: Subject to any disclaimer, the term of this patent is extended or adjusted under 35 U.S.C. 154(b) by 153 days.

(21) Appl. No.: 10/142,317

(22) Filed: May 9, 2002

(65) Prior Publication Data

US 2003/0015546 A1 Jan. 23, 2003

Related U.S. Application Data

(60) Provisional application No. 60/305,473, filed on Jul. 13, 2001.

(51) Int. Cl.
*B67D 5/48* (2006.01)
(52) U.S. Cl. .................................. 222/145.6
(58) Field of Classification Search .................... 222/1, 222/129.1, 129.3, 129.4, 145.6; 366/307, 366/306
See application file for complete search history.

(56) References Cited

U.S. PATENT DOCUMENTS

| | | | | |
|---|---|---|---|---|
| 3,140,861 A | * | 7/1964 | Krup | 366/156.1 |
| 3,671,020 A | * | 6/1972 | Krup | 366/307 |
| 3,920,163 A | | 11/1975 | Brown | 222/190 |
| 3,938,784 A | | 2/1976 | Moreton | |
| 3,946,995 A | * | 3/1976 | Anderson | 366/307 |
| 4,421,413 A | * | 12/1983 | Sekiguchi | 366/307 |
| 4,537,332 A | | 8/1985 | Brown et al. | 222/190 |
| 4,844,928 A | * | 7/1989 | van Heteren et al. | 426/312 |
| 5,795,062 A | | 8/1998 | Johnson | |
| 5,918,768 A | * | 7/1999 | Ford | 222/129.3 |
| 6,149,035 A | * | 11/2000 | Gorski et al. | 222/129.4 |
| 6,176,090 B1 | | 1/2001 | Ufema | |
| 6,267,496 B1 | | 7/2001 | Real | 366/132 |
| 6,325,117 B1 | * | 12/2001 | Burke et al. | 222/129.1 |
| 6,729,753 B1 | * | 5/2004 | Artman et al. | 366/164.6 |

FOREIGN PATENT DOCUMENTS

| | | |
|---|---|---|
| EP | 0 081 449 | 6/1983 |
| EP | 0 986 983 A1 | 3/2000 |

* cited by examiner

*Primary Examiner*—Eric Keasel

(57) ABSTRACT

The present invention relates to the mixing of dry beverage mixes with water. It presents an apparatus for whipping a fluid slurry comprising of an inlet for receiving an unwhipped fluid slurry, a whipping chamber connected to the inlet for whipping the unwhipped fluid slurry, an impeller located in the whipping chamber, one or more indentations in the surface of the whipping chamber, wherein the impeller induces fluid turbulence that produces a whipped fluid slurry when the impeller rotates above the indentations, and an outlet for discharging the whipped fluid slurry.

29 Claims, 5 Drawing Sheets

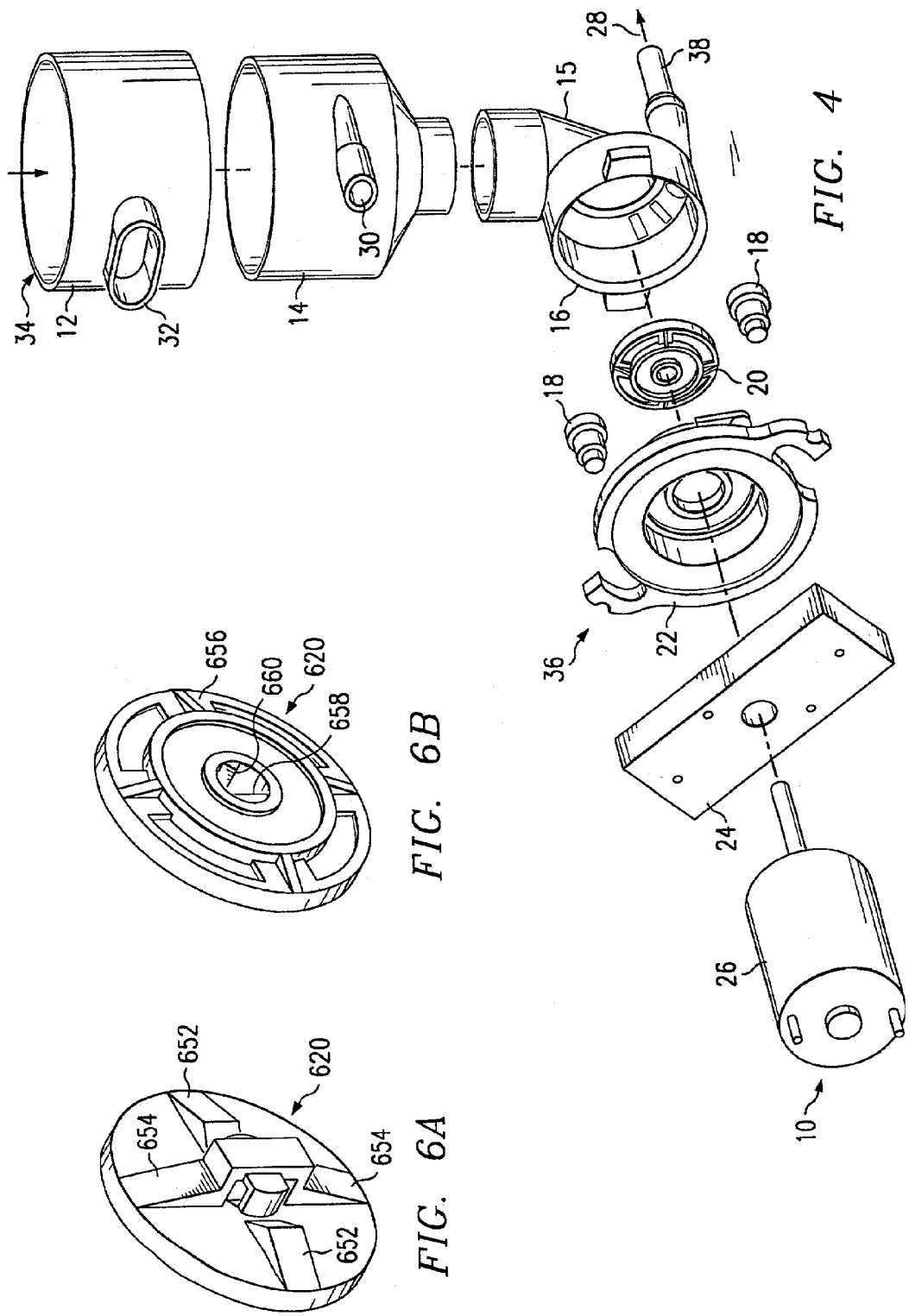

US 7,036,688 B2

SYSTEM FOR WHIPPING A FLUID SLURRY AND METHOD THEREFORE

This application is based on Provisional Application No. 60/305,473, filed Jul. 13, 2001.

BACKGROUND OF THE INVENTION

1. Technical Field

The present invention relates generally to a beverage dispensing device, and more particularly to a device which whips an unwhipped fluid slurry into a whipped, mixed beverage.

2. Description of Related Art

Many consumers purchase hot beverages from vending machines. These vending machines often contain a variety of coffee and chocolate drinks as well as other hot drinks. Often times specialty drinks such as lattés, cappuccinos or espressos are served in the vending machines.

Some prior art vending machines mix a dry beverage mix and hot water in a cup located in a general receiving area by adding the hot water to the dry mix and allowing the agitation from the pouring action of the hot fluid to dissolve the mixture into the fluid. While this will dissolve simple soluble mixes, the pouring action is insufficient to thoroughly dissolve a more complex mix, thereby leaving a residue of mix at the bottom of the cup. Additionally, this method does not provide for a frothing action to produce a crème that is common to such drinks as lattés, cappuccinos or espressos.

Other prior art vending machines mix the dry beverage mix and the hot water within the vending machine. These machines provide some sort of mixing chamber in the vending machine to aid in ensuring that the mix is properly dissolved into solution. However, these previous mixing apparatuses have not been able to provide a sufficient froth that might compare to such beverages obtained from a coffee vending merchant. Specifically, the prior art used a smooth mixing chamber and a stirring mechanism such as an impeller to stir the mix. However, this method also failed to provide the agitation sufficient to produce a suitable froth or crème.

BRIEF SUMMARY OF THE INVENTION

The present invention presents an apparatus for whipping a fluid slurry comprising of an inlet for receiving an unwhipped fluid slurry, a whipping chamber connected to the inlet for whipping the unwhipped fluid slurry, an impeller located in the whipping chamber, one or more indentations in the surface of the whipping chamber, wherein the impeller induces fluid turbulence that produces a whipped fluid slurry when the impeller rotates above the indentations, and an outlet for discharging the whipped fluid slurry.

A method of whipping a fluid slurry, the method comprising the steps of receiving a fluid slurry into a whipping chamber, whipping the fluid slurry by rotating an impeller in the whipping chamber, using one or more indentations within the surface area of the whipping chamber to induce turbulent fluid flow in the whipping chamber, and discharging the whipped fluid slurry from the whipping chamber.

A system for providing a whipped fluid slurry, the system comprising a container for storing a mix, a fluid for mixing with the mix to create an unwhipped fluid slurry, a whipping device comprising of a whipping chamber wherein the whipping chamber has an impeller and indentations in the surface within the chamber, wherein the whipping device is connected to the storage container and receives the mix and the fluid for whipping, a discharge outlet from the whipping device a dispensing area whereby the whipped fluid slurry is dispensed from the discharge outlet.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 illustrates the present invention in its component parts;

FIG. 6A illustrates the mixing chamber side of an impeller used in the present invention;

FIG. 6B illustrates the whipper motor side of the same impeller in 6A;

DETAILED DESCRIPTION OF THE PREFERRED EMBODIMENT

The invention presents a device that whips an unwhipped fluid/dry beverage mix or fluid slurry into a whipped, mixed beverage. Upon receiving the unwhipped fluid slurry into a whipping chamber, an impeller rotates at sufficient speed such that cavitations are created near indentations located in the wall of the whipping chamber. The cavitations are caused by a low pressure region near the interface between the indentations and the chamber wall, resulting in greater fluid mixing and creating a foaming or frothing action within the fluid. The froth is desirable when the fluid is intended to be a hot, whipped beverage such as hot chocolate or a specialized coffee drink.

Figure 1:
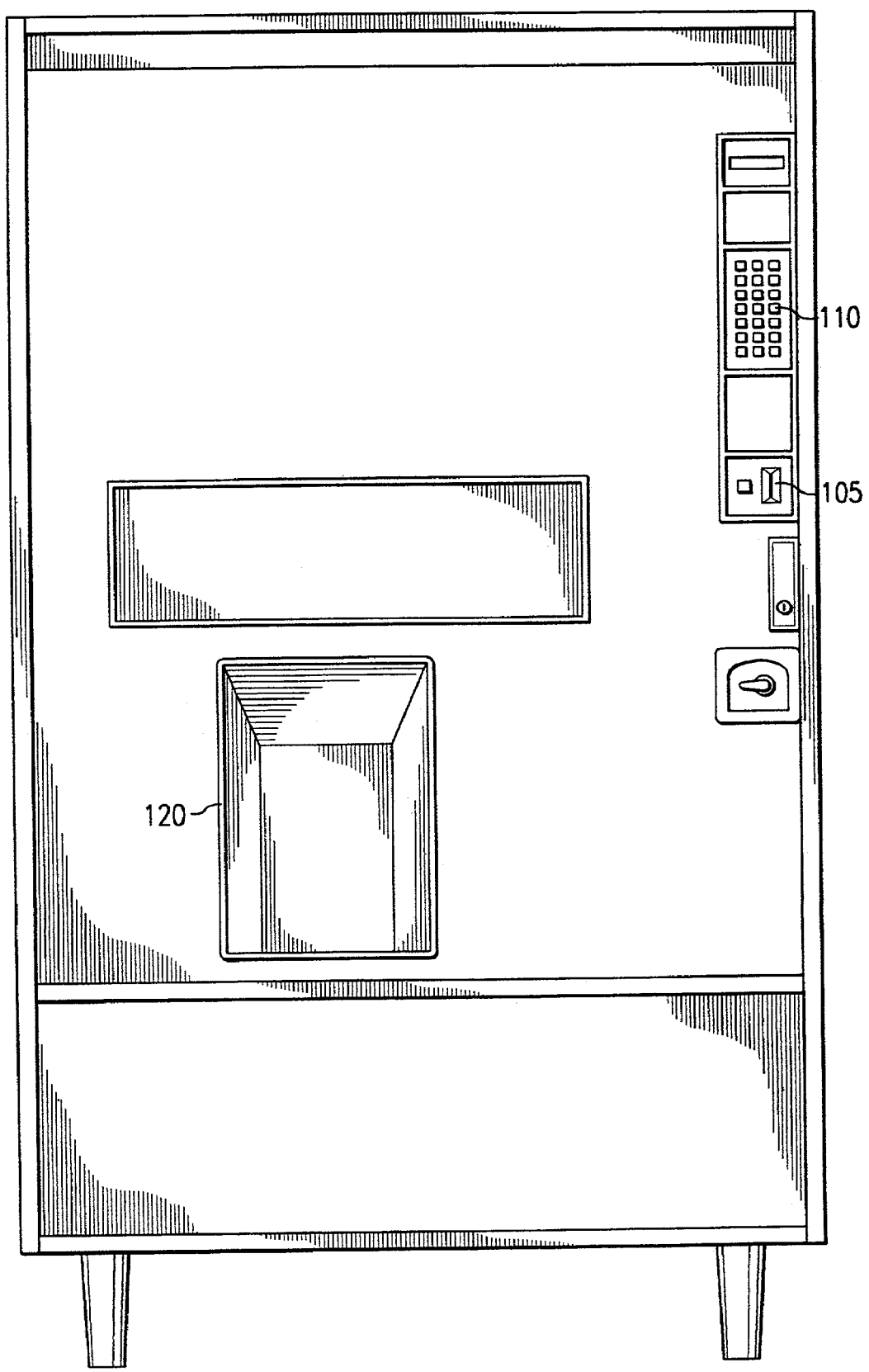
FIG. 1 illustrates the exterior of a typical beverage dispenser in which the present invention may be utilized.

FIG. 1 illustrates the outside of the exterior of a typical beverage dispenser in which the present invention may be utilized. In FIG. 1, the face of beverage dispenser 100 is provided. During its typical use, a customer will insert coins into coin slot 105, and depress the alpha-numeric keypad 110 in order to choose a particular type of drink. Once the drink is selected, the beverage is mixed utilizing the present invention and dispensing the whipped drink into a container in the beverage receiving area at 120, where the customer is able to obtain the product from the beverage dispenser.

Figure 2:
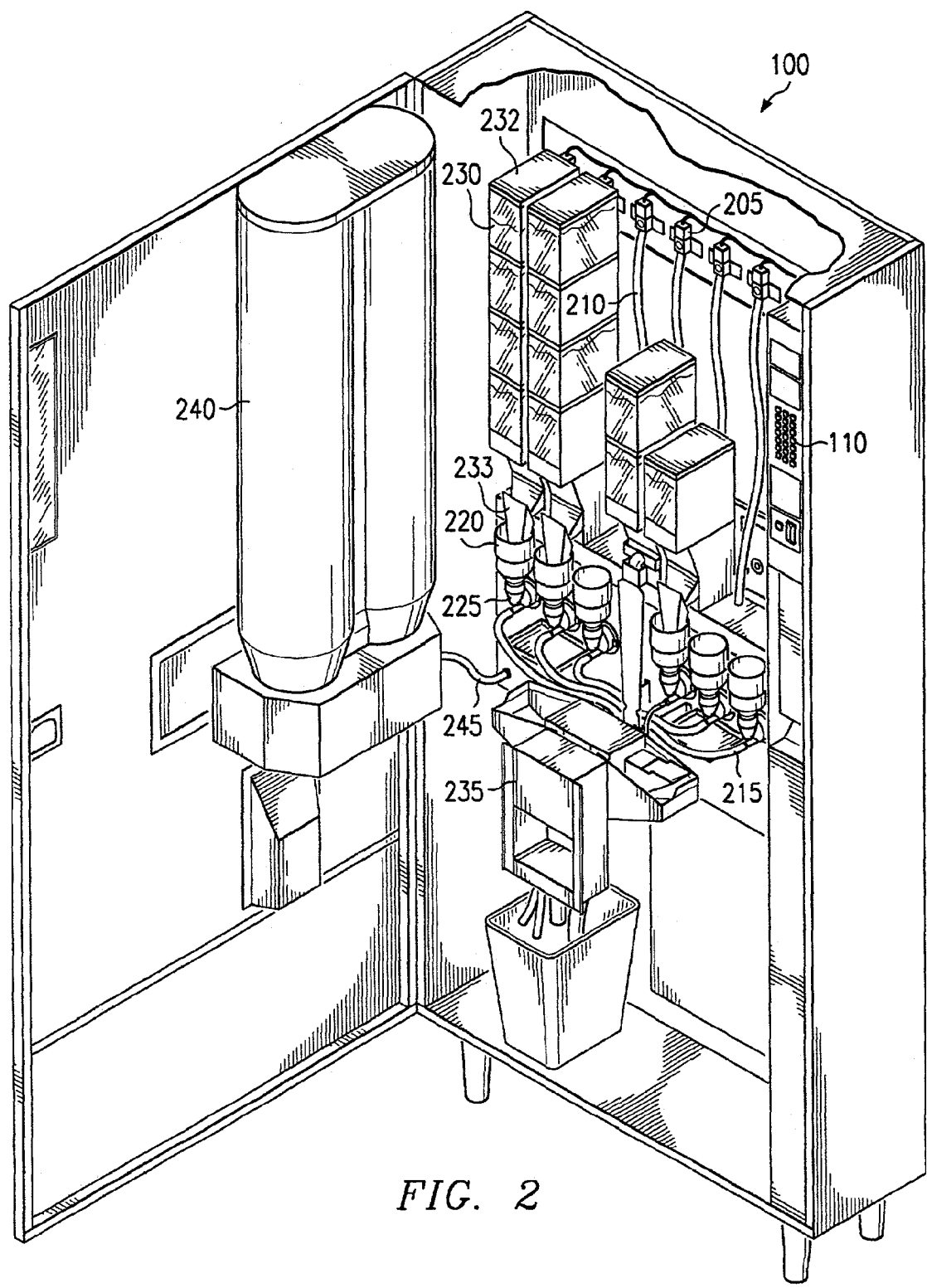
FIG. 2 illustrates the interior of a typical beverage dispenser that utilizes the present invention.

FIG. 2 illustrates the interior of a typical beverage dispenser that utilizes the present invention. In FIG. 2, dry beverage mix 230 is stored within the beverage dispenser in container 232. When a customer places an order for a drink using alpha-numeric pad 110, a cup. corresponding to the ordered drink is sent from the cup storage unit, 240, into the drink dispensing area 235. Upon the cup being sent, an electronic controller ports hot water from the water storage tank within the machine (not shown) into the mixing chamber through line 305 (see FIG. 3). In the preferred embodiment, prior to the hot water entering the mixing chamber 220, the impeller begins to rotate. This begins immediately prior to the mix porting to the mixing chamber and the initial in-rush of hot water provides for a "washing" action within the chamber. Just after the first in-rush of hot water, the mix corresponding to the selected beverage is sent by an auger (not shown) into the whipping chamber inlet 220 via chute 233. Chute 233 collects and directs the dry mix into 220 and prevents the dry mix from splashing into the main components of dispenser 100. As the dry mix enters the mixing chamber 220, and comes into contact with the hot water and impeller in the whipping chamber 225, it is an unwhipped fluid slurry. As the unwhipped fluid slurry becomes stirred by the impeller, pressure builds up in the mixing chamber and discharges the mix fluid through output hose 215 into the waiting cup in the beverage dispenser 235.

Figure 3:
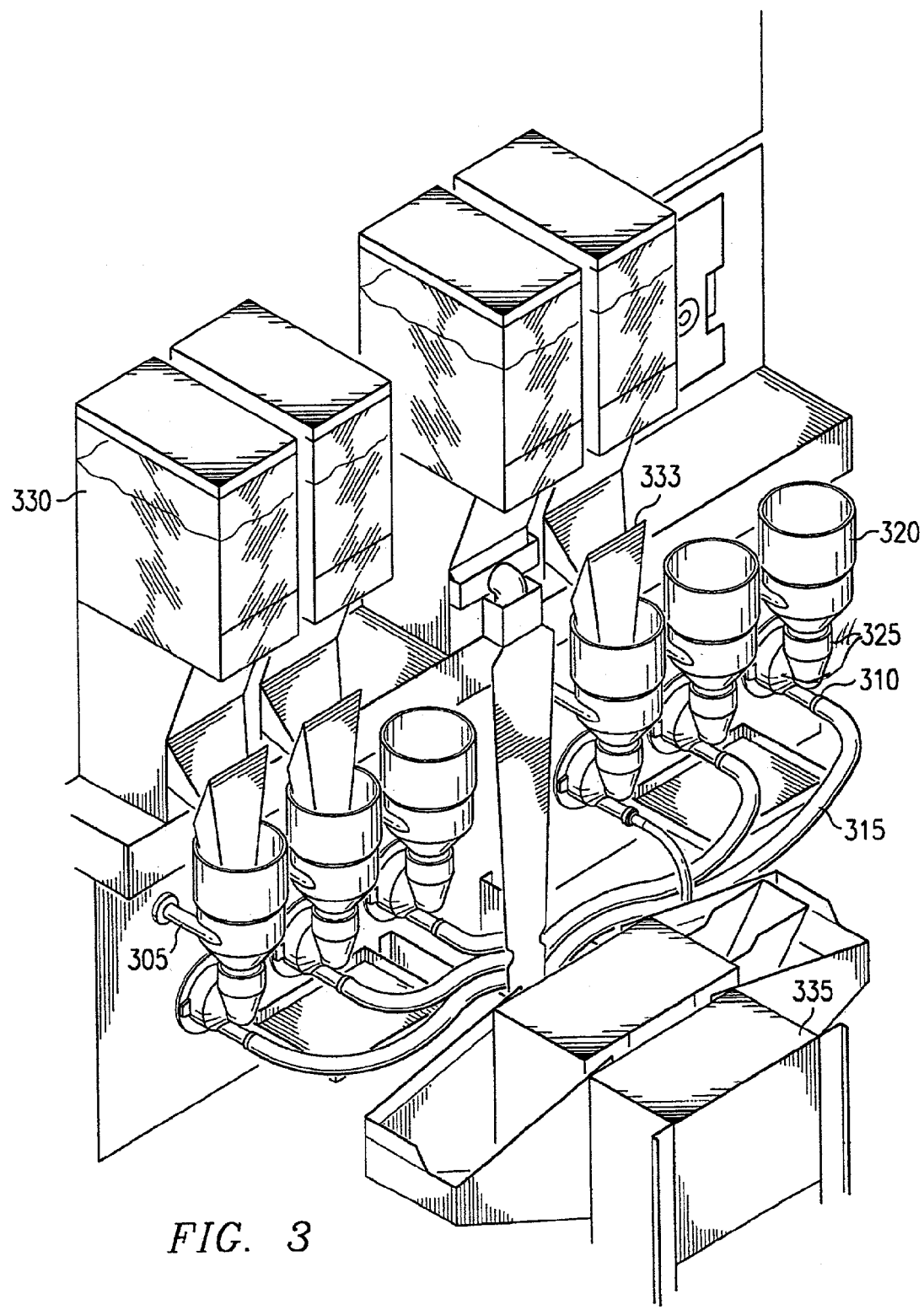
FIG. 3 illustrates a close up view of the mixing area and the whipping chamber.

FIG. 3 illustrates a close up view of the mixing area and the whipping chamber which incorporates the present invention. In FIG. 3, dry beverage mix 330 is guided into the whipping chamber inlet 320 by product chute 333. As described above, hot water enters the chamber via port 305. The impeller begins to rotate upon receiving an order and when the mix and water or the unwhipped fluid slurry enters the whipping chamber 325, the impeller (not visible here) begins to stir or whip the unwhipped fluid slurry into a whipped or mixed combination. The mixed combination is discharged through discharge tube 315. Discharge tube 315 carries the mixed fluid slurry into the beverage receiving area 335 for the customer to receive the ordered beverage. Depending on the drink associated with the particular mix, a restrictor 310 may be added to the outlet of 325 to place a back pressure on the whipping chamber. As will be shown later, this back pressure will cause a greater formation of crème to occur.

FIG. 4 illustrates the present invention and its component parts. In FIG. 4, the unwhipped fluid slurry enters the whipping chamber through the exhaust vent cap 12. Exhaust port 32 is provided to allow excess steam from the hot water/impeller action to escape from the chamber away from the dry mix and chute 233. This prevents a caking of the dry mix at or near the chute area.

Mixing bowl 14 is located directly underneath exhaust cap 34. Hot water enters through water inlet 30 and combines with the dry beverage mix in the mixing bowl to become the unwhipped fluid slurry. The unwhipped fluid slurry then enters into the whipping chamber 15 via both gravity and a vacuum drag created by the impeller operation in the whipping chamber.

As the slurry enters the whipping chamber 16, the water and dry beverage mix are whipped or stirred by the impeller 20, which is connected to whipper motor 26 through a hole in mounting block 24 and mounting base 22. Mounting base 22 creates a seal with the motor and shaft and whipping impeller. Screw caps 18 are inserted into the mounting block 24 in order to firmly attach the mounting base to the whipping motor.

The present invention has indentations located in the interior surface of the whipping chamber 16 closest to the impeller surface. In the preferred embodiment, as the impeller reaches its intended speed, the rotation of the fluid begins to reach the speed of the impeller. The rotation creates a low pressure region within the whipping chamber nearest to the mixing bowl, which causes the unwhipped fluid slurry from the mixing bowl to be drawn into the whipping chamber. This causes the pressure interior to the whipping chamber (but near the interface between the impeller and chamber wall) to rise as more unwhipped fluid slurry is pulled into the whipping chamber. When the rapidly rotating, higher pressure fluid slurry passes near the interface between the indentations and the chamber, a low pressure region near the interface is created due to the indentations, which causes cavitations to occur within the fluid.

These cavitations have a two fold effect. First, they cause a greater sheering effect of the fluid slurry than would occur just from the rotating fluid. This sheering effect in turn enhances dissolving and mixing the dry beverage mix in the water. Additionally, the cavitations can create a bubbling or foaming effect in the fluid mixture, which may be desirable for creating the crème or froth needed in serving certain hot beverages. However, those skilled in the art will understand that should frothing not be desirable, the speed of the impeller, or side of the indentation may be adjusted so as to maintain the sheering effect preventing the cavitations.

The impeller may rotate at various speeds, from approximately 8500 to 17,000 revolutions per minute (RPM), within the whipping chamber, depending on a variety of factors including the design of the indentation, the type of drink and impeller design. It is important to note that the relationship between the speed of the impeller and the size and shape of the indentations are determined so that cavitation occurs within the chamber. A slower impeller rotation may be used with a different indentation configuration and achieve the same result. The same holds true for a higher impeller revolution rate. Those skilled in the art will understand that higher speeds will exaggerate the effect of the present invention and cause more crème or froth to be created, but will work at lower speeds. In the preferred embodiment, the impeller operates at 17,000 rpms.

As the whipping impeller rotates in the whipping chamber, the mixed fluid is discharged through the output 28 due to the higher pressure within the whipping chamber compared to the lower pressure region exterior to the whipping chamber.

Should the type of specialty drink requite it, in order to increase the time that the fluid is in contact with the impeller/indentation combination, the pressure interior to the whipping chamber can be increased by placing a restrictor on the discharge time. This increase pressure is not great enough to reduce any cavitations and increases the contact time between the fluid and the present invention to create a greater amount of cavitations thereby creating extra crème or froth for the drink.

The mixing chamber as shown in FIG. 4 may be for a specialty drink such as an espresso type drink, and the output restrictor 38 maintains the interior whipping pressure sufficiently high to ensure that the discharged product has sufficient amount of crème. However, those skilled in the art will understand that a restrictor is not necessary for the invention to operate, but only enhances the frothing or crème produced.

Figure 5:
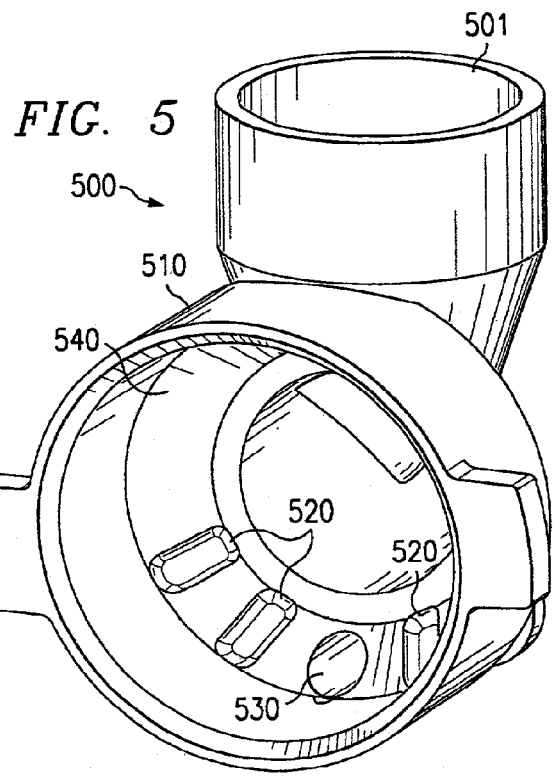
FIG. 5 illustrates the whipping chamber in greater detail.

FIG. 5 illustrates the whipping chamber in greater detail. In FIG. 5, the whipping chamber 500 comprises of an inlet 501 and a mixing chamber 510. Within the mixing chamber are indentations 520. Additionally, an indentation for the discharge outlet 530 is contained in the mixing chamber.

As mentioned above, one other effect of the cavitations is to create a greater frothing of the mixture. Because of the relative inelasticity of fluid as compared to a fluid/air mixture of froth, the froth is the last to be discharged from the whipping chamber. This causes the froth to be placed on top of the beverage in the container in the receiving area. This presents a very pleasing and appealing presentation of the product to the consumer and is very desirable for certain types of hot beverages that the consuming public purchases, such as lattés, espressos and cappuccinos.

The combination of the indentations in the whipping chamber, the rate of motor speed for the impeller, the impeller configuration, and the restriction on the outlet if utilized, comprise to create the necessary ingredients for the shearing effect and the cavitations produced in the whipping chamber. As mentioned above, these combinations can be varied to produce the same effect. The use of the indentations in the whipping chamber along with the motor speed impeller configurations and restriction on the outlet, combine to achieve reliability and throughput which allows the impeller geometry to be bigger with a smaller pitch. Additionally, a higher degree of quality is maintained in the dispensed fluid due to the dynamic mixing action in the whipping chamber.

FIG. 6A illustrates a view of a preferred embodiment of an impeller as used in the present invention, the view being from the mixing chamber side. Impeller 620 contains two sets of breakers. Breakers 652 are angular shaped which assists in bringing the fluid up to speed by the impeller. Breakers 654 are perpendicular to breakers 652 and provide the same function of dynamically moving the fluid. Thus, these breakers assist in creating the fluid velocity necessary to mix the slurry and create the cavitations.

FIG. 6B illustrates a view of the same impeller in 6A from the side of the impeller motor. Impeller 620 contains structural supports 656 that help support the impeller during the revolutions. Snap detent groove 660 allows for mechanical attachment of the impeller arm to the whipping motor. The snap detent has a "D" shaped positioning registration to assist in proper alignment of the impeller arm to the whipping motor, and provides positive drive while preventing the impeller from slipping during rotation.

Figure 8:
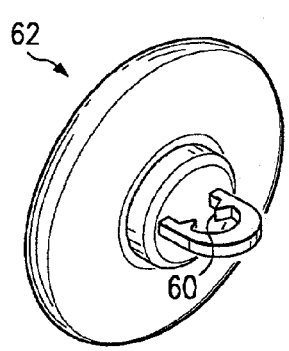
FIG. 8 illustrates the mixing chamber side of an alternative impeller.
Figure 9:
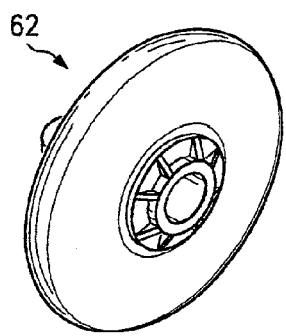
FIG. 9 illustrates the whipper motor side of an alternative impeller.

While FIGS. 6A and 6B show an impeller configuration used in the preferred embodiment, those skilled in the art will understand that different impeller configurations may be utilized as well. FIG. 8 illustrates a chamber side view of an alternative impeller. In FIG. 8, breaker 60 assists in the dynamic fluid movement while the remainder of the impeller remains smooth. This type of impeller may have serrations on its edge to assist in fluid movement. FIG. 9 shows the side of the impeller connected to the drive motor.

Figure 7:
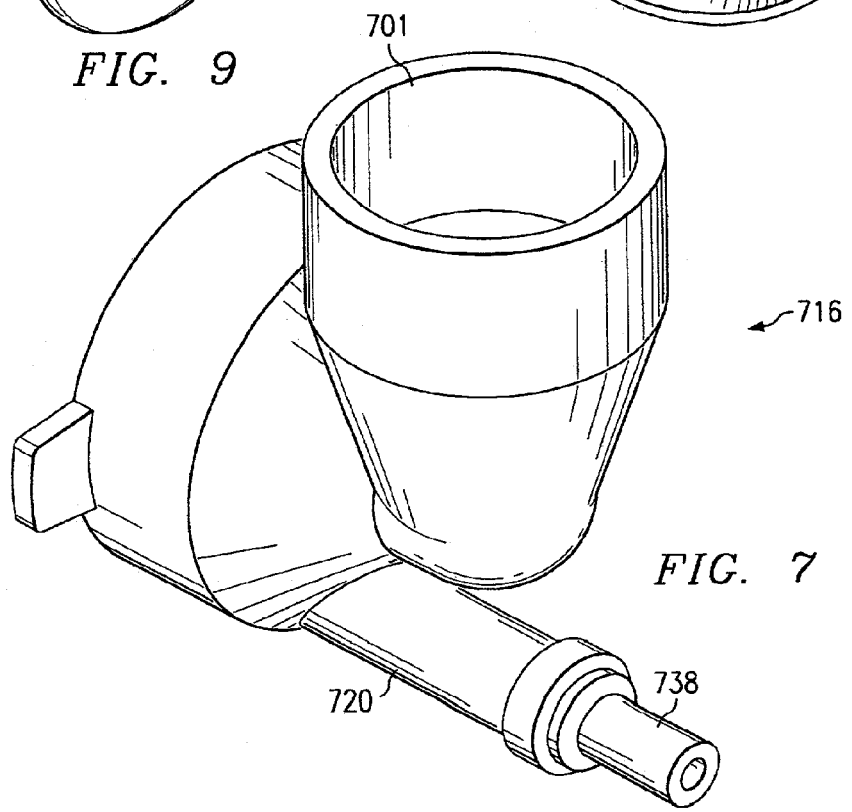
FIG. 7 illustrates the exterior view of the backside of the whipping chamber.

FIG. 7 illustrates the exterior view of the backside of the whipping chamber. In FIG. 7, whipping chamber 716 is shown with the discharge outlet 720 and restrictor 738 on the end of the discharge outlet. As described above, restrictor 738 restricts the discharge of the fluid from the whipping chamber and creates enough back pressure to cause a greater fluid contact time in the whipping chamber while the fluid is being rotated by the impeller.

Having thus described our invention, what we claim as new and desire to secure by Letters Patent is set forth in the following claims.

The invention claimed is:

1. An apparatus for whipping a slurry comprising of:
   a whipping chamber;
   an impeller located in the whipping chamber, wherein the impeller induces dynamic fluid flow of a slurry within the chamber; and
   one or more indentation(s) recessed into a surface of the chamber such that a bottom surface of each indentation is offset from the surface of the chamber, wherein the impeller and the one or more indentation(s) create cavitation in the fluid flow of the slurry near interface(s) between the one or more indentation(s) and the surface of the chamber.

2. The apparatus in claim 1 wherein turbulence in the fluid flow is caused by the cavitations near the interface(s) between the one or more indentations and the surface of the chamber.

3. The apparatus in claim 2 wherein the turbulence creates a shearing effect in the slurry near the interface(s).

4. The apparatus in claim 1 further comprising an outlet orifice to discharge the fluid.

5. The apparatus in claim 1 further comprising:
   a discharge outlet; and
   a restrictor coupled to the discharge outlet to increase the time the slurry remains in contact with the interface(s) prior to exiting the discharge outlet.

6. The apparatus in claim 1 wherein the impeller further comprises at least one breaker located on a side of the impeller nearest to the indentation(s).

7. The apparatus in claim 1 wherein the impeller further has serrations located on a side of the impeller nearest to the indentation(s).

8. The apparatus in claim 1 wherein the impeller rotates at least at 8500 revolutions per minute.

9. The apparatus of claim 1, wherein said surface surrounds a space in which said fluid flow occurs, and wherein each said indentation surrounds a respectively corresponding portion of said space.

10. The apparatus of claim 9, wherein said surface extends along, surrounds and tapers toward a rotational axis of said impeller.

11. The apparatus of claim 10, wherein said surface tapers toward said rotational axis as the surface extends away from said impeller.

12. The apparatus of claim 1, wherein the whipping chamber includes a wall that surrounds a space in which the fluid flow of the slurry occurs, wherein the surface is an interior surface of the wall, and wherein each indentation surrounds a respectively corresponding portion of the space.

13. The apparatus in claim 1 wherein cavitation in the fluid flow of the slurry is produced by a rate of movement of the impeller, a configuration of the impeller, and restriction on a discharge outlet in combination with the one or more indentation(s).

14. A method of whipping a slurry, the method comprising:
   whipping the slurry by rotating an impeller in a whipping chamber;
   inducing turbulence in the whipping chamber during whipping by creating cavitation in the slurry near interface(s) between a surface of the whipping chamber and one or more indentation(s) recessed into the surface of the whipping chamber such that a bottom surface of each indentation is offset from the surface of the whipping chamber; and
   discharging the whipped slurry from the whipping chamber.

15. The method of claim 14, further comprising rotating the impeller at least at 8500 revolutions per minute.

16. The method of claim 14 further comprising cavitating the slurry near the interface(s) between the one or more indentation(s) and the surface of the whipping chamber to produce one or both of shearing effects and turbulence.

17. The method of claim 14 further comprising providing at least one breaker on a surface of the impeller closest to the one or more indentation(s) in the surface of the whipping chamber.

18. The method of claim 17 further comprising creating turbulence at interface(s) between the one or more indentation(s) and the surface of the whipping chamber using the breaker.

19. The method of claim 14 further comprising restricting the discharge of the whipped slurry using a restrictor.

20. The method of claim 14 further comprising creating a shearing effect in the slurry near the one or more indentation(s).

21. The method of claim 14 further comprising using serrations on a side of the impeller nearest to the one or more indentation(s).

22. A system for providing a whipped beverage, the system comprising:
- a customer order system;
- a dry beverage mix electronically connected to the customer order system;
- a whipping chamber for mixing the dry beverage from a customer order and hot water;
- an impeller located interior to the whipping chamber for whipping the dry beverage and hot water into a slurry and inducing fluid flow in the slurry;
- one or more indentation(s) recessed into a surface of the whipping chamber and having a bottom surface offset from the surface of the whipping chamber; and
- a discharge outlet from the whipping chamber to dispense the whipped slurry into a customer receptacle,
wherein rotation of the impeller within the whipping chamber creates cavitation in the fluid flow of the slurry near interface(s) between the surface of the whipping chamber and the one or more indentation(s).

23. The system in claim 22 wherein the impeller rotates faster than 8500 revolutions per minute.

24. The system in claim 22 wherein turbulence is produced in the slurry near the interface(s) as the impeller rotates near the one or more indentation(s).

25. The system in claim 22 wherein a shearing effect is produced in the slurry near the interface(s) as the impeller rotates near the one or more indentation(s).

26. The system in claim 22 wherein the discharge outlet is located between two of the indentation(s).

27. The system in claim 22 further comprising a restrictor located on the discharge outlet to restrict discharge of whipped fluid slurry.

28. The system in claim 22 wherein the impeller further comprises at least one breaker located on the side of the impeller nearest to the indentation(s).

29. The system in claim 22 wherein the impeller further has serrations located on the side of the impeller nearest to the indentations.

* * * * *

UNITED STATES PATENT AND TRADEMARK OFFICE
CERTIFICATE OF CORRECTION

| | | |
|---|---|---|
| PATENT NO. | : 7,036,688 B2 | Page 1 of 1 |
| APPLICATION NO. | : 10/142317 | |
| DATED | : May 2, 2006 | |
| INVENTOR(S) | : Gregory G. Stettes and Franklin D. Newkirk | |

It is certified that error appears in the above-identified patent and that said Letters Patent is hereby corrected as shown below:

Column 3, line 5, delete "." after "cup" and insert -- , --.

Claim 1, column 6, line 8, delete "interface" and insert -- interface(s) --.

Claim 1, column 6, line 9, delete "(s)".

Claim 2, column 6, line 12, delete "cavitations" and insert -- cavitation --.

Claim 20, column 7, line 16, delete "indentation" and insert -- indentation(s) --.

Claim 20, column 7, line 17, delete "(s)".

Signed and Sealed this

Twenty-second Day of August, 2006

JON W. DUDAS
*Director of the United States Patent and Trademark Office*